United States Patent
Monreal et al.

(10) Patent No.: US 10,286,552 B2
(45) Date of Patent: May 14, 2019

(54) METHOD FOR OPERATING A BRAKE AND AN ASSOCIATED MACHINE, IN PARTICULAR A ROBOT

(71) Applicant: KUKA Deutschland GmbH, Augsburg (DE)

(72) Inventors: Karsten Monreal, Stadtbergen (DE); Carsten Angeli, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 213 days.

(21) Appl. No.: 15/303,078

(22) PCT Filed: Apr. 9, 2015

(86) PCT No.: PCT/EP2015/057763
§ 371 (c)(1),
(2) Date: Oct. 10, 2016

(87) PCT Pub. No.: WO2015/155305
PCT Pub. Date: Oct. 15, 2015

(65) Prior Publication Data
US 2017/0050317 A1    Feb. 23, 2017

(30) Foreign Application Priority Data
Apr. 11, 2014   (DE) .......................... 10 2014 207 072

(51) Int. Cl.
*B25J 9/16*   (2006.01)
(52) U.S. Cl.
CPC ........... *B25J 9/1633* (2013.01); *B25J 9/1674* (2013.01); *G05B 2219/40218* (2013.01)

(58) Field of Classification Search
CPC .................. B25J 9/1633; B25J 9/1674; G05B 2219/40218
(Continued)

(56) References Cited

U.S. PATENT DOCUMENTS 4,794,311 A * 12/1988 Kiya ...................... G05B 19/23
                                                       318/569
5,004,968 A *  4/1991 Mizuno ................ G05B 19/416
                                                       318/571
(Continued)

FOREIGN PATENT DOCUMENTS

CN        103507082 A    1/2014
DE     102005015608 A1   10/2006
(Continued)

OTHER PUBLICATIONS

European Patent Office; Search Report and Written Opinion in International Patent Application No. PCT/EP2015/057763 dated Jan. 2, 2016; 21 pages.
(Continued)

*Primary Examiner* — Jaime Figueroa
(74) *Attorney, Agent, or Firm* — Dorton & Willis, LLP

(57) ABSTRACT

The invention relates to a method for operating a brake of a machine that has a machine control unit and at least one moveable link that can be actuated by the machine control unit and that can be adjusted by a drive motor actuated by the machine control unit, which motor drives a shaft and which motor, in an engaged (closed) position of a brake that can be automatically actuated by the machine control unit, can be locked by said brake. The invention also relates to a machine with a machine control unit, in particular a robot with a robot control unit, which is configured and/or equipped for carrying out such a method.

17 Claims, 7 Drawing Sheets

(58) Field of Classification Search
USPC .................................................. 700/245, 258
See application file for complete search history.

(56) References Cited

U.S. PATENT DOCUMENTS

| | | | |
|---|---|---|---|
| 5,144,213 A | 9/1992 | Sasaki et al. | |
| 5,587,635 A * | 12/1996 | Watanabe | G05B 19/4065 318/271 |
| 5,783,922 A | 7/1998 | Hashimoto et al. | |
| 6,711,946 B2 * | 3/2004 | Hofmann | G01L 5/28 73/121 |
| 8,069,714 B2 * | 12/2011 | Ortmaier | B25J 13/085 73/121 |
| 8,686,670 B2 * | 4/2014 | Verheyen | H02P 3/04 318/370 |
| 9,021,873 B2 * | 5/2015 | Shikagawa | G01M 13/00 73/121 |
| 9,334,911 B2 * | 5/2016 | Kameta | F16D 65/14 |
| 2008/0309273 A1 * | 12/2008 | Kamiya | B25J 9/1674 318/563 |
| 2009/0187277 A1 * | 7/2009 | Bird-Radolovic | B25J 9/1674 700/245 |
| 2009/0200978 A1 * | 8/2009 | Kato | B25J 9/1674 318/566 |
| 2011/0010010 A1 * | 1/2011 | Kai | B25J 19/063 700/255 |
| 2011/0245970 A1 * | 10/2011 | Wells | B25J 19/0004 700/245 |
| 2013/0218332 A1 * | 8/2013 | Hofmann | B25J 19/0004 700/245 |
| 2014/0000355 A1 * | 1/2014 | Shikagawa | G01M 13/00 73/118.01 |

FOREIGN PATENT DOCUMENTS

| | | | | |
|---|---|---|---|---|
| DE | 102008027754 A1 | 1/2009 | | |
| DE | 10 2008 041 866 B3 | 4/2010 | | |
| EP | 0924583 A2 | 6/1999 | | |
| EP | 1239354 A1 | 9/2002 | | |
| EP | 1574301 A2 * | 9/2005 | ............. | G05B 19/40 |
| EP | 1574301 A2 | 9/2005 | | |
| EP | 1710549 A2 * | 10/2006 | ............... | G01L 5/28 |
| EP | 1710549 A2 | 10/2006 | | |
| EP | 2067580 A1 | 6/2009 | | |
| EP | 2631043 A2 | 8/2013 | | |

OTHER PUBLICATIONS

Chinese Patent Office; Office Action in Chinese Patent Application No. 2015800192381 dated May 17, 2017; 12 pages.

* cited by examiner

METHOD FOR OPERATING A BRAKE AND AN ASSOCIATED MACHINE, IN PARTICULAR A ROBOT

CROSS-REFERENCE TO RELATED APPLICATIONS

This application is a national phase application under 35 U.S.C. § 371 of International Patent Application No. PCT/EP2015/057763, filed Apr. 9, 2015 (pending), which claims the benefit of German Patent Application No. DE 10 2014 207 072.4 filed Apr. 11, 2014, the disclosures of which are incorporated by reference herein in their entirety.

TECHNICAL FIELD

The invention relates to a method for operating a brake of a machine that has a machine control unit and at least one moveable link that can be actuated by the machine control unit and that can be adjusted by a drive motor actuated by the machine control unit, which motor drives a shaft and which motor, in an engaged (closed) position of a brake that can be automatically actuated by the machine control unit, can be locked by said brake. The invention also relates to a machine with a machine control unit, in particular a robot with a robot control unit, which is configured and/or equipped for carrying out such a method.

BACKGROUND

DE 10 2008 041 866 B3 describes a method for checking a brake of a robot, having the following steps: operation of a robot having a plurality of spindles, wherein the robot has a drive allocated to one of the spindles of the plurality of spindles, a brake allocated to this spindle, which is equipped for at least reducing a movement of this spindle, and a torque sensor allocated to this spindle that is equipped for determining the torque acting on this spindle; activation of the brake; determination of the torque acting on the spindle by means of the torque sensor with the brake activated, and assessment of the functionality of the brake on the basis of an analysis of the torque determined by the torque sensor.

EP 1 239 354 B1 describes a method for controlling and monitoring a brake mechanism with a nominal torque, which mechanism is allocated to a drive unit of an item of a piece of industrial equipment such as a handling device, wherein a holding current corresponding to a holding torque of the drive unit with the brake mechanism released (open) is measured and stored, and wherein the drive unit with the brake mechanism engaged (closed) is subjected to a spindle-specific current value, which subjects the brake mechanism to a torque that is equal to or less than the nominal torque of the brake mechanism, and the drive is simultaneously monitored for standstill.

EP 0 924 583 A2 describes a method for checking motor brakes for electric motors, in particular of robots, wherein the electric motor is coupled to a mechanical motor brake, characterized in that the mechanical brake to be checked is activated, thereby preventing the rotor of the electric motor from turning, that the defined startup current fed to the motor or the startup voltage applied to the motor is briefly altered, that a first value of at least one of the motor parameters changing as a result is determined, that this first value is compared to a second value of the motor parameter, which was determined for the same startup current or the same startup voltage but with the mechanical brake not activated, and that a failure of the mechanical brake is detected on the basis of the difference between the first value and the second value of the motor parameter.

SUMMARY

The objective of the invention is that of creating a method for operating a brake of a machine, in particular an associated robot with such a brake, the functionality of which can be checked and by means of which the machine, in particular the robot, can be operated in a safe manner.

The objective of the invention is achieved by a method for operating a brake of a machine that has a machine control unit and at least one moveable link that can be actuated by the machine control unit and that can be adjusted by means of a drive motor actuated by the machine control unit, which motor drives a shaft and which motor, in an engaged position of a brake that can be automatically actuated by the machine control unit, can be locked by said brake, said method having the steps:

Provision of at least two braking torque values that are determined in different rotation angle positions of the shaft distributed over 360 degrees with the brake engaged in each case, Analysis of the at least two braking torque values by comparing one braking torque value with the at least one other braking torque value, and Actuation of the machine, the drive motor, and/or the brake on the basis of a result from the comparison of the braking torque values.

The object of the invention is in particular achieved by a method for operating a brake of a robot that has a robot control unit and a robot arm actuated by the robot control unit, which arm has at least a first link, a second link, and a joint connecting the first link to the second link that can be adjusted by means of a drive motor, which motor drives a shaft and which motor, in an engaged position of a brake that can be actuated automatically by the robot control unit, can be locked by said brake, said method having the steps:

Provision of at least two braking torque values that are determined in different rotation angle positions of the shaft distributed over 360 degrees, with the brake engaged in each case, Analysis of the at least two braking torque values by comparing one braking torque value with the at least one other braking torque value, and Actuation of the robot, the drive motor, and/or the brake on the basis of a result from the comparison of the braking torque values.

The invention will be described in the following, at times and in particular with reference to a robot as a machine. Unless explicit reference is made to robot-specific aspects, the technical teaching described is also broadly inventively suited and/or intended for application in machines other than robots.

The brake is in particular a safety brake. The brake can be an electromagnetic brake, which is configured to be engaged (closed) in a basic state and which can be brought with spring loading into a released (open) position, in which the brake is held open by means of electrical energy and which brake returns automatically to its engaged position, i.e., the basic state, owing to the spring loading when the electrical energy is removed.

The brake can have a stationary brake part that is connected to the first link of the robot arm and a brake part that is rotatable in a released position of the brake and that sits on a shaft driven by the drive motor, the shaft being coupled to the second link of the robot arm. The drive motor can have a motor housing that is fixedly connected to, in particular flange-mounted on, the first link of the robot arm. The drive motor can have a motor shaft that is coupled directly to the second link or coupled via an interposed transmission to the second link. The inventive shaft, which is driven by the drive motor in all alternative embodiments, can be the motor shaft itself or a shaft connected directly to the motor shaft, or a shaft coupled indirectly to the motor shaft. In particular the brake can be arranged in the drive chain between the drive motor and a transmission. In this respect the inventive shaft can also be a transmission input shaft. In particular with transmissions with a low gear ratio of at most 1:10, for example, the inventive shaft can optionally also be an output-side shaft, on which the brake sits.

In a special embodiment, provision of at least two braking torque values can be made by determining the braking torque values in different rotation angle positions of the motor shaft distributed over 360 degrees, with the brake engaged in each case. Here as well, the at least two braking torque values are analyzed by comparing one braking torque value with the at least one other braking torque value, and the robot and/or the brake is/are actuated on the basis of a result from the comparison of the braking torque values of the different rotation angle positions of the motor shaft.

Braking torque value can be understood to mean the amount of the torque to be applied to the shaft with the brake engaged in normal operation, or rather is needed or would be needed to set the stationary shaft in motion despite the brake being engaged.

Because provision is inventively made for recording at least two braking torque values in different rotation angle positions of the shaft distributed over 360 degrees with the brake engaged in each case, different braking effects that may arise on the same brake can be detected. Such different braking effects can arise as a function of the respective rotation angle position of the shaft, in particular of the motor shaft, in which the brake brought the shaft or motor shaft to a standstill. Possible causes for such rotation angle position-dependent braking torque values may be component and/or mounting position and orientation tolerances such as shafts positioned and oriented slightly off center, shaft cross sections deviating from the ideal circular shape, or non-coaxial brake mounting positions and orientations.

In general, the robot can have several joints, a separate drive motor and a separate brake can be allocated to each joint, and the inventive method can be implemented on several or all joints and brakes, respectively, and/or drive motors of the robot.

With the analysis of the at least two braking torque values by comparing one braking torque value with the at least one other braking torque value, it is possible to determine the rotation angle positions of the shaft, in particular of the motor shaft, in which the brake has a better braking effect or a worse braking effect.

In the subsequent actuation of the robot, of the drive motor, and/or of the brake on the basis of a result from the comparison of the braking torque values, the robot, the drive motor, and/or the brake can be actuated in such a way that the joint comes to a stop in a rotation angle position of the shaft, in particular of the motor shaft, in which the brake has a better braking effect than in other rotation angle positions. In this process, the drive motor can be actively (i.e., forced by the robot control) turned further until the shaft has reached the rotation angle position with the better braking effect. As an alternative or in addition, the robot control unit can actively hold the brake open to a certain extent for a time interval so that the shaft will be braked with lesser braking effect until the rotation angle position with the better braking effect is reached.

For providing the at least two braking torque values, in all embodiments a corresponding number of brake tests can be carried out in different rotation angle positions of the shaft distributed over 360 degrees. For carrying out such a brake test the shaft, in particular the motor shaft, can be brought into a first rotation angle position. In this first rotation angle position, the brake is engaged and, with the brake engaged, the allocated drive motor is revved up (i.e., its driving torque increased) until the shaft starts to slide under the engaged brake. The sliding, i.e., the beginning of a shaft revolution, can be detected by appropriate angle encoders such as resolvers, incremental encoders, or absolute angle measurement sensors, in particular ones already present in the robot, and analyzed by the robot control unit. At the point in time when the shaft starts moving under the engaged brake, the torque applied by the drive motor shortly before this moment is measured and stored as a braking torque allocated to this rotation angle position. The applied torque can be determined in particular from the motor currents, but in an alternative or supplemental embodiment, it can also be measured by separate torque sensors or force sensors, in particular directly on the shaft. In the same manner as described, such a brake test can be used for determining and providing other braking torque values in other rotation angle positions.

In a first variant of the inventive method, the machine control unit, in particular the robot control unit, automatically provides a brake test result qualifying the brake as functional if at least one of the braking torque values provided by the brake tests is greater than a predetermined minimum braking torque value. The minimum braking torque value can be derived from a machine construction- or rather robot construction-dependent, factory-set torque value. The minimum braking torque value can also be calculated from the machine construction- or rather robot construction-dependent factory-set torque value, in particular with a safety factor added in. The result qualifying the brake as functional can be shown on a display connected to the machine control unit or robot control unit. As an alternative or in addition, the machine control unit or robot control unit can permit the continued, automatically or manually controlled operation of the machine or robot on the basis of this result.

In a second variant of the inventive method, the machine control unit, in particular the robot control unit, automatically provides a brake test result qualifying the brake as functional only if all of the braking torque values provided by the brake tests are greater than a predetermined minimum braking torque value. The minimum braking torque value can be derived from a machine construction- or rather robot construction-dependent, factory-set torque value. The minimum braking torque value can also be calculated from the machine construction- or rather robot construction-dependent, factory-set torque value, in particular with a safety factor added in. The result qualifying the brake as functional can be shown on a display connected to the machine control unit or robot control unit. As an alternative or in addition, the machine control unit or robot control unit can permit the continued, automatically or manually controlled operation of the machine or robot on the basis of this result.

In a third variant of the inventive method, the machine control unit, in particular the robot control unit, automatically provides a brake test result qualifying the brake as nonfunctional if at least one, in particular all of the braking torque values provided by the brake tests is/are less than a predetermined minimum braking torque value. The minimum braking torque value can be derived from a machine construction- or rather robot construction-dependent, factory-set torque value. The minimum braking torque value can also be calculated from the machine construction- or rather robot construction-dependent, factory-set torque value, in particular with a safety factor added in. The result qualifying the brake as nonfunctional can be shown on a display connected to the machine control unit or robot control unit, in particular with a note stating that the brake must be repaired or replaced. As an alternative or in addition, on the basis of this result the machine control unit or robot control unit can prevent the continued automatically or manually controlled operation of the machine, in particular of the robot, in other words shut down the machine, in particular the robot, and/or automatically give notification of a maintenance case.

In a special variant of the inventive method, said method can have the following steps:

Determination of a first angle range of less than 360 degrees, which includes at least the rotation angle position of the shaft, in particular of the motor shaft of the drive motor, in which the brake has at least one braking torque value that is less than a predetermined minimum braking torque value, and Actuation of the brake and/or of the drive motor, in particular by means of the machine control unit or the robot control unit in such a way that when the brake is engaged, the shaft, in particular the motor shaft of the drive motor, comes to a stop in a second angle range that is different from the first angle range.

In a special variant of the inventive method, said method can have the following steps:

Determination of a first angle range that is less than 360 degrees, which includes at least the rotation angle position of the shaft, in particular of the motor shaft, in which the brake has the smallest braking torque value of all braking torque values, and Actuation of the brake and/or of the drive motor, in particular by means of the machine control unit or the robot control unit in such a way that with the brake engaged, the shaft, in particular the motor shaft comes to a stop in a second angle range that is different from the first angle range.

In another special variant of the inventive method, said method can have the following steps:

Determination of one or more first angle ranges less than 360 degrees, which include(s) at least the rotation angle position of the shaft, in particular of the motor shaft of the drive motor, in which the brake has braking torque values that are less than a predetermined minimum braking torque value, Determination of one or more second angle ranges less than 360 degrees, which include(s) at least the rotation angle position of the shaft, in particular of the motor shaft of the drive motor, in which the brake has braking torque values that are equal to or greater than a predetermined minimum braking torque value, and Actuation of the brake and/or of the drive motor, in particular by means of the machine control unit or the robot control unit in such a way that with the brake engaged, the shaft, in particular the motor shaft of the drive motor comes to a stop in the second angle range or in one of the plurality of second angle ranges.

In a special alternative embodiment of the method, the first angle range can include the rotation angle position corresponding to the smallest braking torque value, in particular in the middle of the range. The first angle range can include up to ca. 270 degrees. In a more special alternative embodiment, the first angle range can be up to 180 degrees. In a more special alternative embodiment, the first angle range can be between 10 degrees and 90 degrees.

In a special alternative embodiment of the method, the second angle range can include the rotation angle position corresponding to the greatest braking torque value, in particular in the middle of the range. The second angle range can include up to ca. 270 degrees. In a more special alternative embodiment, the second angle range can be up to 180 degrees. In a more special alternative embodiment, the second angle range can be between 10 degrees and 90 degrees.

In all alternative embodiments of the method, the result of the comparison of the braking torques can be automatically displayed in particular to a person operating the machine, in particular the robot, in particular on a display means connected to the machine, in particular to the robot control unit, and provision can be made such that the machine or robot, the drive motor, and/or the brake can only be actuated on the basis of the result from the comparison of the braking torque values if an input means to be actuated by the person is activated.

The invention also relates to a method for determining a minimum braking torque value of a brake of a machine, in particular a robot, which has a machine control unit or robot control unit and at least one moveable link that can be actuated by the machine control unit or robot control unit according to a machine program or robot program and that can be adjusted by means of a drive motor actuated by the machine control unit or robot control unit, which motor drives a shaft and which motor, in an engaged position of a brake that can be automatically actuated by the machine control unit or robot control unit, can be locked by said brake, in particular also for carrying out a method as described above, having the steps:

Actuation of the machine, in particular the robot, by the machine control unit or robot control unit according to the machine program or robot program, Determination, in particular measurement of driving torques of the drive motor in several positions or poses of the at least one link, said positions or poses being assumed as a result of an execution of the machine program or robot program, Selection of the largest driving torque determined, in particular measured, as a predetermined minimum braking torque value.

In the case of an exemplary robot, first the robot program can be completely executed, thus moving the robot into all positions, i.e., poses, assumed by the robot according to the robot program, wherein during the automatic movement of the robot according to the robot program, in particular all drive motors are monitored, i.e., their driving torques are logged in a stepwise or continuous manner and the largest driving torque is selected from all measured driving torques and stored as the predetermined minimum braking torque value. The driving torques can be measured on the shaft by, for example, sensors such as force and/or torque sensors, or calculated from the motor currents of the drive motors. However, the driving torques can optionally also be determined on the basis of a dynamic model of the robot by simulating the movement processes according to the robot program, in other words determined, in particular calculated in an offline process.

In a special alternative embodiment of the method for determining a minimum braking torque value, the selected driving torque can be stored in the machine control unit or robot control unit, a minimum braking torque value can be predetermined, in particular a minimum braking torque value can be manually input into the machine control unit or robot control unit, and the machine control unit or robot control unit can be equipped to allow an automatic release of the brake and/or an automatic movement of the at least one link only if the predetermined minimum braking torque value is greater than the stored selected driving torque.

The inventively described brake tests and the inventively described method for determining a minimum braking torque value verify that a freely selectable reference torque is reached by the brake. These reference values can be, for example, holding torques specified by a brake manufacturer. Optionally, permanent holding torques of the drive unit employed can be used to calculate a minimum, as an alternative or in addition correction factors for measurement errors that cannot be modeled and/or safety conditions can be taken into account in order to react to brake wear in a timely manner.

In particular maximum absolute driving torques across all poses of the actual robot application can be used as reference values. Depending on the technological possibilities, these values can be determined using torque sensor systems or drive currents, for example.

In order to prevent, for example, a system programmer from carrying out the brake test with unsuitable reference values, the reference values of the brake test can be reported to the motion planning of the control unit, in particular without the possibility of influence by the system programmer. After a positive brake test, the control unit then rejects all programmed movements that, if they were executed, would lead to static overshoots of the reference values.

Because the reference values are checked against static driving torques in such an embodiment, preference is given to the choice of the maximum absolute static driving torques over an application routine as brake test reference values. If a simulation environment with a static physical model of the robot is available for the robot application, the reference values can also be determined in advance or offline.

The object is also inventively achieved with a machine having a machine control unit and at least one moveable link than can be actuated by the machine control unit and adjusted by means of a drive motor actuated by the machine control unit, which motor drives a shaft and which motor, in an engaged position of a brake that can be automatically actuated by the machine control unit, can be locked by said brake, in particular by a robot having a robot control unit, a robot arm actuated by the robot control unit and having at least a first link, a second link, and a joint connecting the first link to the second link, and at least one drive motor that is configured to adjust the joint, furthermore having a brake that can be automatically actuated by the robot control unit, which brake, when in an engaged position, locks the motor, wherein the machine control unit, in particular the robot control unit, is configured and/or equipped to carry out an inventive method as described.

BRIEF DESCRIPTION OF THE DRAWINGS

Concrete exemplary embodiments of the invention are explained in greater detail in the following description with reference to the attached figures. Concrete features of these exemplary embodiments may show general features of the invention, regardless in what concrete context they are mentioned, perhaps analyzed individually or in combination.

Wherein.

DETAILED DESCRIPTION

Figure 1:
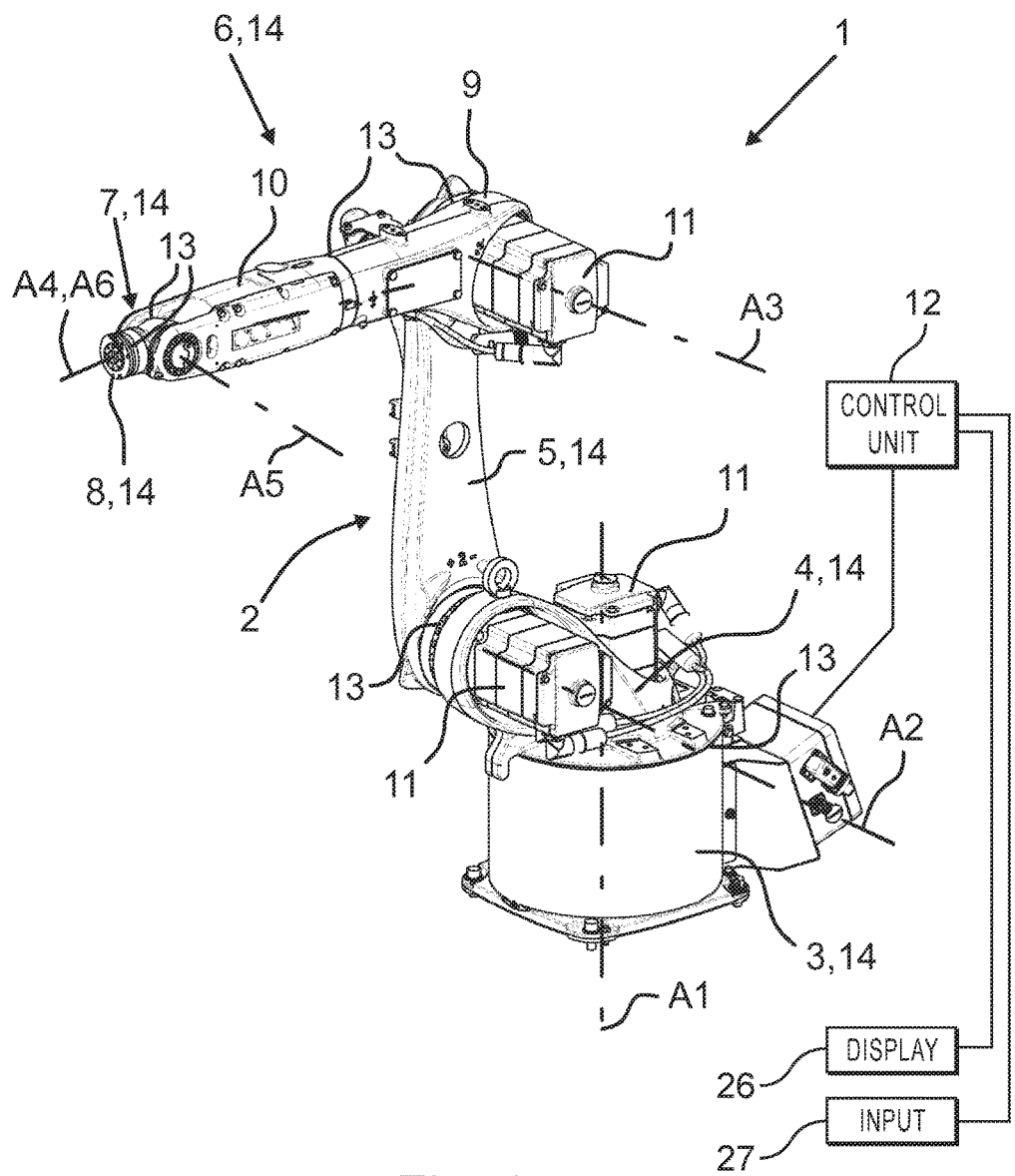
FIG. 1 is a perspective illustration of a robot with a robot control unit and a robot arm, the joints of which can be adjusted by electric drive motors.

FIG. 1 shows a robot 1, comprising a robot arm 2 and a robot control unit 12. The robot arm 2 comprises, in the case of the present exemplary embodiment, several links 14 arranged behind one another and connected via joints 13. The links 14 are in particular a frame 3 and a carousel 4 mounted rotatably about an axis A1 which extends vertically relative to the frame 3. In the case of the present exemplary embodiment, other links of the robot arm 2 are a link arm 5, a cantilever 6, and a preferably multiaxial robot hand 7 with a fastening device configured as a flange 8 for fastening an end effector not shown in greater detail. The link arm 5 is mounted at the bottom end, e.g., on a link arm bearing head not shown in greater detail, on the carousel 4 so that it can pivot about a preferably horizontal axis of rotation A2. At the upper end of the link arm 5, the cantilever 6 is also mounted so that it can pivot about a likewise preferably horizontal axis A3. At its end, this cantilever carries the robot hand 7 with its preferably three axes of rotation A4, A5, A6.

In the case of the present exemplary embodiment, the cantilever 6 has an arm housing 9 pivotally mounted on the link arm 5. A basic hand housing 10 of the cantilever 6 is mounted on the arm housing 9 so that it can pivot about the axis of rotation A4.

The robot arm 2 can be moved by means of three electric drive motors 11 in its three basic axes and by means of three additional electric drive motors 11 in its three hand axes.

The robot control unit 12 of the robot 1 is designed and/or equipped to execute a robot program, by which the joints 14 of the robot arm 2 can be automated according to the robot program or automatically adjusted and/or rotationally moved in a manual drive operation. For this purpose, the robot control unit 12 is connected to the actuatable electric drive motors 11, which are designed to adjust the joints 14 of the robot arm 2.

Figure 2:
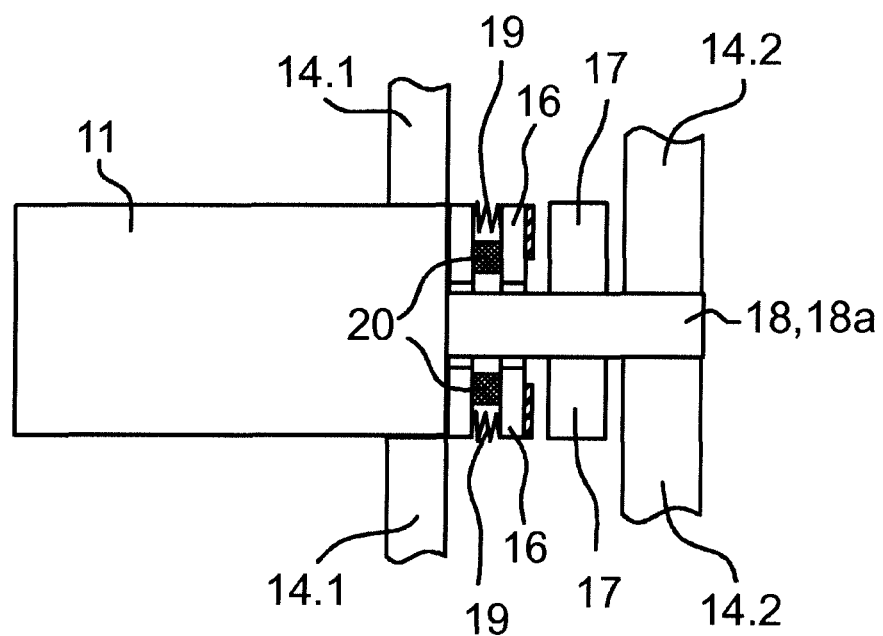
FIG. 2 is a schematic illustration of an arrangement of a drive motor and an allocated brake at one of the joints of the robot arm according to FIG. 1.

By way of an example, one of the drive motors 11 of the robot 1 according to FIG. 1 is shown schematically and by itself in FIG. 2. The illustrated drive motor 11 has a brake 15 that can be automatically actuated by the robot control unit 12 (FIG. 1) and that, in an engaged position, locks the drive motor 11.

The brake 15 is configured as a safety brake and has a stationary brake part 16, which is connected to the first link 14.1, and a brake part 17 capable of rotating in a released position of the brake 15, which sits (by means of a spline shaft connection, for example) on a shaft 18 driven by the drive motor 11, wherein the shaft 18 is either directly (as shown) coupled or optionally indirectly coupled to the second link 14.2 via an interposed transmission (not shown). In the exemplary embodiment shown, the brake 15 is configured as an electromagnetic brake 15. The brake 15 is configured to be engaged (closed) in a basic state, wherein it brought with spring tensioning by means of spring coils 19 into a released (open) position, in which the brake 15 is held open by means of electrical energy by an electromagnet 20. When the electrical energy is removed, the brake 15 automatically returns to its engaged position (i.e., the basic position) under the spring tensioning, in particular by means of the mechanical spring coils 19.

Figure 3:
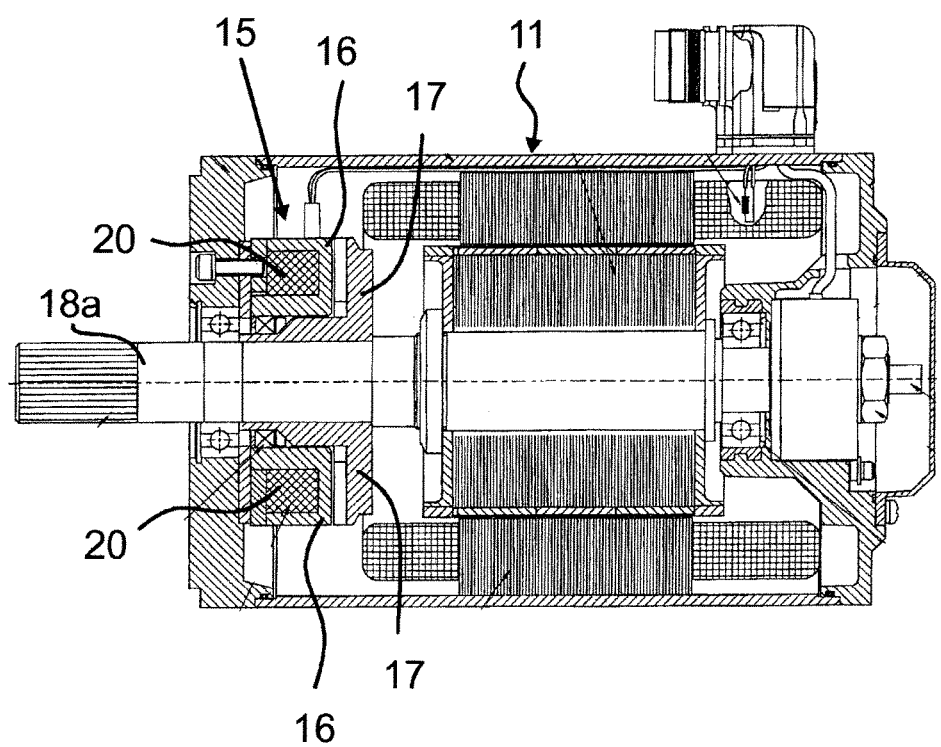
FIG. 3 is a sectional view through an exemplary drive motor in which a brake is integrated, which brake sits on the motor shaft.

An exemplary embodiment of a brake 15 integrated in the drive motor 11 is shown in a sectional view in FIG. 3. Also in this embodiment, the brake 15 is configured as a safety brake and has a stationary brake part 16 and a brake part 17 capable of rotating in a released position of the brake 15, which sits in a rotationally fixed manner on the motor shaft 18a driven by the drive motor 11. The brake 15 is held open by the electromagnets 20.

Figure 4:
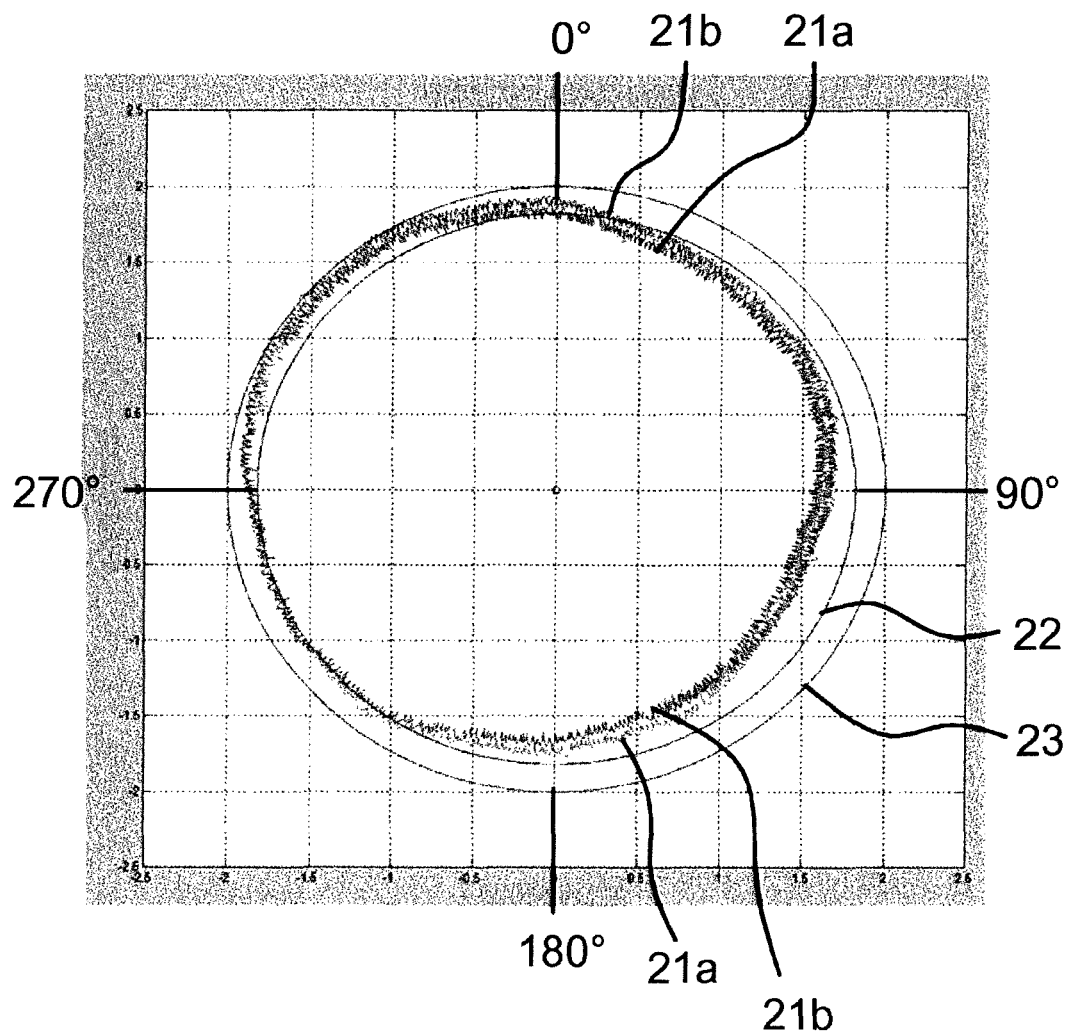
FIG. 4 is a graphic four quadrant representation of braking torques of an exemplary brake measured over 360 degrees of rotation angle positions of a motor shaft of an exemplary drive motor.

FIG. 4 shows the rotation angle-dependent braking torques 21a, 21b as a function of the motor position, i.e., the rotation angle position of the motor shaft 18a of two independent series of measurements at different drive-side positions of the motor shaft 18a over a full 360 degree rotation.

An inner circle 22 exemplarily represents the design-induced, predetermined minimum target braking torque (minimum braking torque value) specified for this brake 15. An outer circle 23 exemplarily represents the braking torque at which a brake 15 is deemed sufficiently functional. This can be derived from, for example, the predetermined minimum target braking torque, i.e., from the minimum braking torque values (inner circle 22) with an added safety factor.

It is evident that there are ranges (specifically from 0 degrees to 270 degrees in the exemplary embodiment illustrated) of the motor positions, i.e., of the rotation angle position of the motor shaft 18a, in which the specified (minimum) braking torque cannot be reached, whereas an at least satisfactory braking torque can be reached in other ranges (specifically from 270 degrees to ca. 350 degrees in the exemplary embodiment illustrated) of the motor position.

Figure 5:
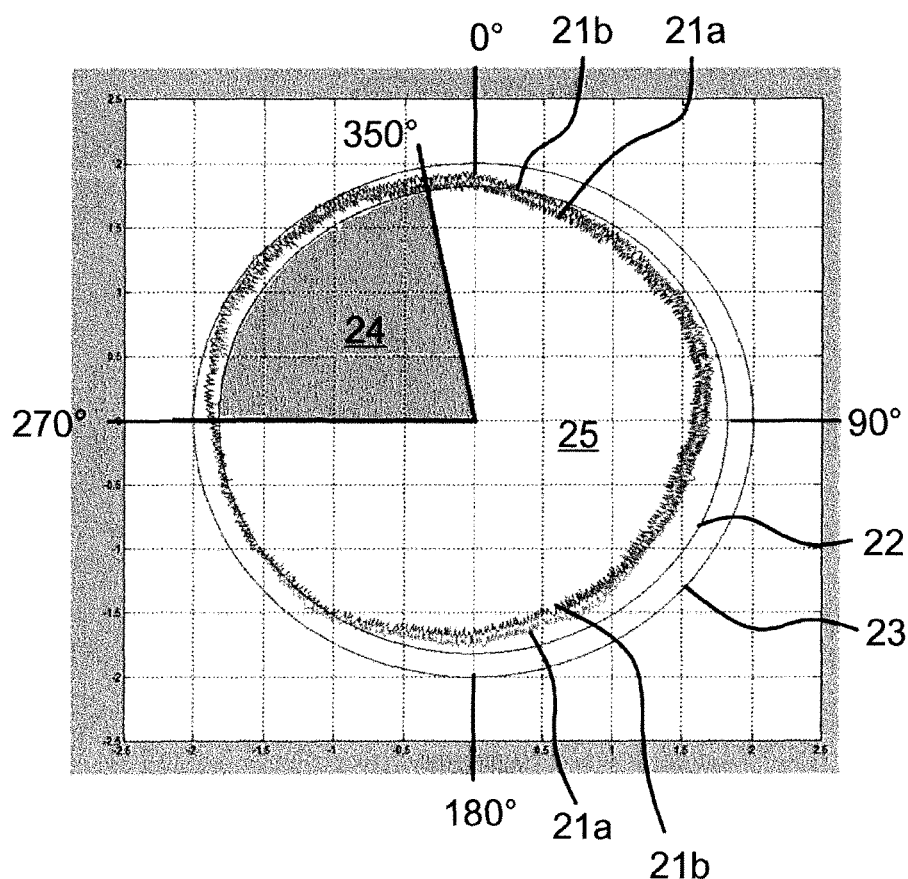
FIG. 5 is the graphic four quadrant representation of the braking torques of the exemplary brake measured over 360 degrees of rotation angle positions of the motor shaft of the exemplary drive motor according to FIG. 4, with a second, shaded angle range in which the motor shaft is inventively supposed to come to a stop.

FIG. 5 shows the braking torques of the exemplary brake 15 measured over 360 degrees of rotation angle positions of the motor shaft 18a of the exemplary drive motor 11 according to FIG. 4, with a shaded second angle range 24 in which the motor shaft should inventively come to a stop. Hence in the illustrated exemplary embodiment of the motor position, from 270 degrees to ca. 350 degrees an at least satisfactory braking torque can be reached.

Hence before the deactivated state of the robot is assumed, if necessary and if possible the motor shaft 18a of the exemplary drive motor 11 will assume a rotation angle position within an identified sector (second angle range 24) and only then will the brake 15 be engaged (closed).

Figure 6:
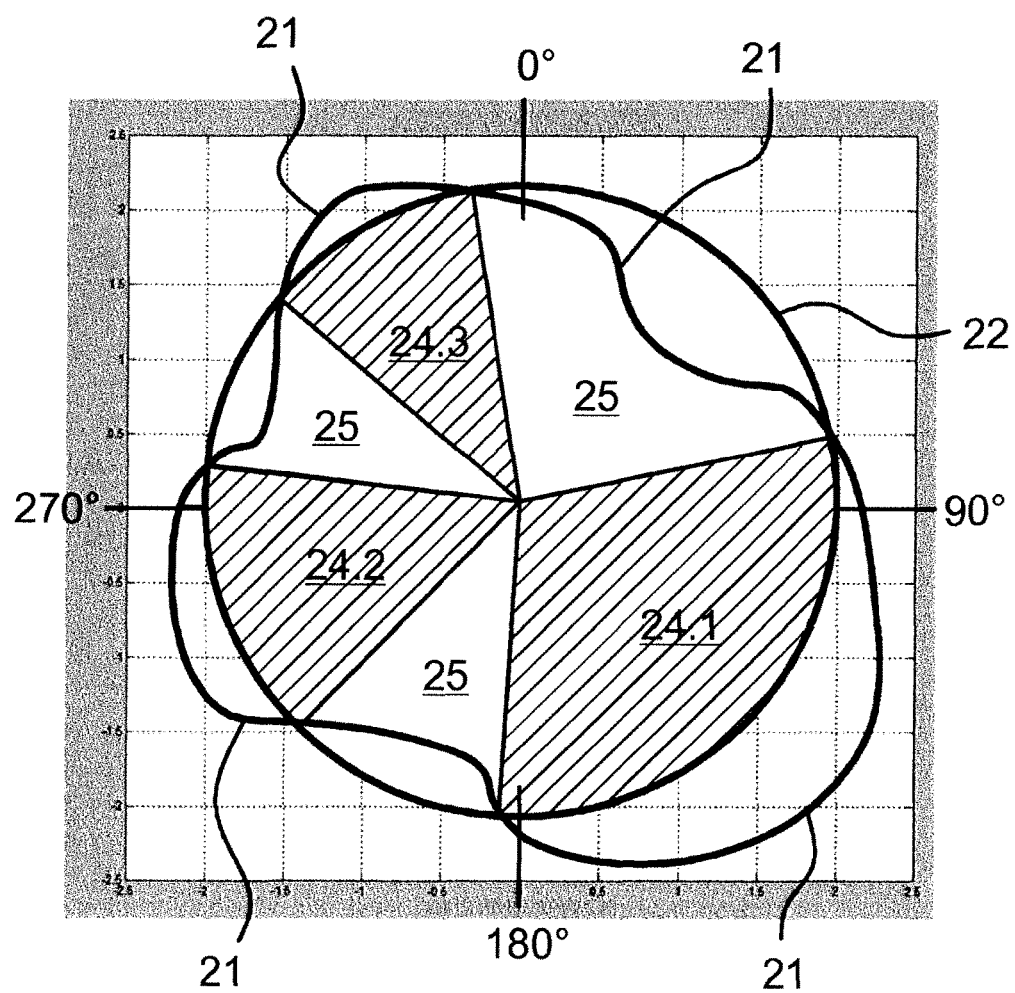
FIG. 6 is a graphic four quadrant representation of the measured braking torques of another brake, in particular of a different design with several, i.e., three crosshatched second angle ranges in which the motor shaft is inventively supposed to come to a stop.

FIG. 6 shows the measured braking torques (represented by the line 21) of another exemplary brake, in particular of another design with several, i.e., three crosshatched second angle ranges 24.1, 24.2, and 24.3 in which the motor shaft should inventively come to a stop.

According to this exemplary progression of the line 21 of the actual braking torques measured, three angle ranges arise in which the line 21 reaches and/or exceeds the minimum braking torque value defined by the circle 22. Hence in this exemplary embodiment there is a second angle range 24.1 that includes the angle range from ca. 80 degrees to 185 degrees, another second angle range 24.2 that includes the angle range from ca. 225 degrees to 275 degrees, and still another second angle range 24.3 that includes the angle range from ca. 320 degrees to 350 degrees. An at least satisfactory braking torque can be reached in these three angle ranges 24.1, 24.2, and 24.3.

Hence before the deactivated state of the robot is assumed, if necessary and if possible the motor shaft 18a of the exemplary drive motor 11 will assume a rotation angle position within one of these three identified sectors (crosshatched second angle ranges 24.1, 24.2, and 24.3) and only then will the brake 15 be engaged (closed).

Figure 7:
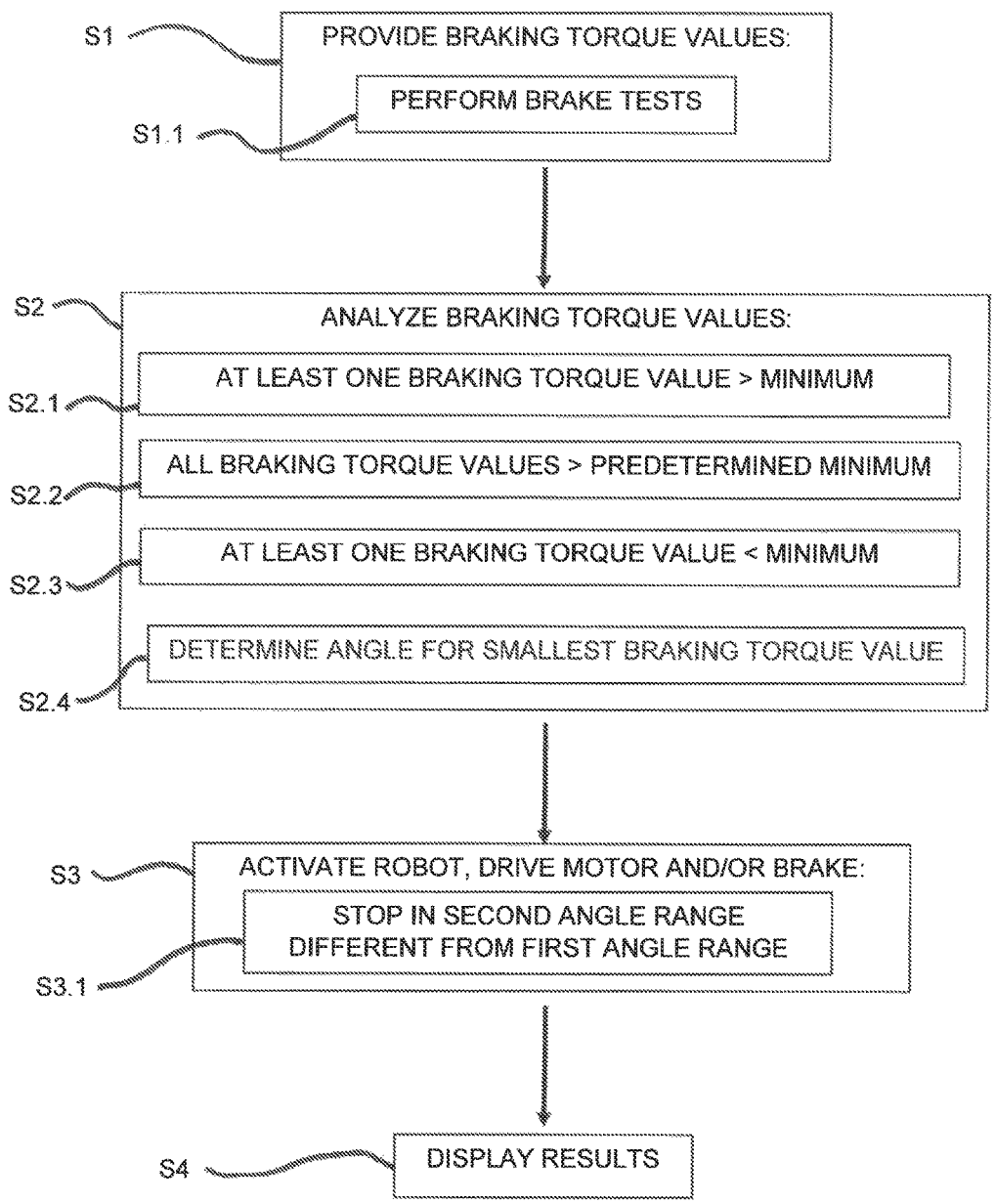
FIG. 7 is an exemplary flowchart of inventive method steps.

According to the exemplary flowchart illustrated in FIG. 7, an inventive method has a first step S1 of providing at least two braking torque values, which are determined in different rotation angle positions of the shaft 18, 18a distributed over 360 degrees, with the brake 15 engaged in each case. In a second method step S2, an analysis of the at least two braking torque values is performed by comparing one of the braking torque values with the at least one other braking torque value. In a third step S3, the robot 1, the drive motor 11, and/or the brake 15 are actuated on the basis of a result from the comparison of the braking torque values.

For providing the at least two braking torque values in step S1, according to a first alternative a corresponding number of brake tests can be performed in different rotation angle positions of the shaft 18, 18a distributed over 360 degrees in an intermediate step S1.1.

In the analysis according to step S2, in a substep S2.1 the robot control unit 12 can automatically provide a brake test result qualifying the brake 15 as functional if at least one of the braking torque values provided by the brake tests is greater than a predetermined minimum braking torque value.

In the analysis according to step S2, in a second substep S2.2 as an alternative to the substep S2.1 provision can be made such that the robot control unit 12 automatically provides a brake test result qualifying the brake 15 as functional only if all of the braking torque values provided by the brake tests are greater than a predetermined minimum braking torque value.

As an alternative or in addition to the substeps S2.1 and S2.2, in a third substep S2.3 the robot control unit 12 can automatically provide a brake test result qualifying the brake 15 as nonfunctional if at least one, in particular all of the braking torque values provided by the brake tests is/are less than a predetermined minimum braking torque value.

In another substep S2.4, a first angle range less than 360 degrees can be determined that includes at least the rotation angle position in which the brake 15 has the smallest braking torque value of all braking torque values provided.

In another substep S3.1, the brake 15 and/or the drive motor 11 can be actuated, in particular by means of the robot control unit 12, in such a way that with the brake 15 engaged, the shaft 18, 18*a* comes to a stop in a second angle range 24 that is different from a first angle range 25.

In substep S3.1, the first angle range 25, in particular a first angle range 25 of 270 degrees, can comprise the rotation angle position corresponding to the smallest braking torque value, in particular in the middle of the range.

In substep S3.1, the second angle range 24, in particular a second angle range 24 of 90 degrees, can comprise the rotation angle position corresponding to the greatest braking torque value, in particular in the middle of the range.

In a supplemental and/or concluding method step S4, the result of the comparison of the braking torques can be displayed to a person operating the robot 1 on a display means 26, in particular at the robot control unit 12. The robot 1, the drive motor 11, and/or the brake 15 are then actuated on the basis of the result from the comparison of the braking torque values only if an input means 27 to be actuated by the person, in particular an input means 27 connected to the robot control unit 12, is activated.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for operating a brake of a machine, the machine having a control unit and at least one moveable link actuated by the machine control unit, wherein the link is adjustable by a drive motor that is actuated by the machine control unit, the drive motor driving a shaft and being lockable by the brake in an engaged position of a brake that is automatically actuated by the machine control unit, the method comprising:
   providing at least two braking torque values wherein the brake is engaged and that are determined in different rotation angle positions of the shaft distributed over 360 degrees;
   analyzing the at least two braking torque values by comparing one braking torque value with the at least one other braking torque value; and
   actuating at least one of the machine, the drive motor, or the brake based on a result from the comparison of the braking torque values.

2. The method of claim 1, wherein:
   the machine is a robot, the machine control unit is a robot control unit, and the robot has a robot arm actuated by the robot control unit;
   the robot arm has at least a first link, a second link, and a joint that connects the first link to the second link and that can be adjusted by the drive motor, which drives the shaft and which, in an engaged position of the brake that is automatically actuated by the robot control unit, is lockable by the brake; and
   at least one of the robot, the drive motor, or the brake are actuated on the based on the result of the comparison of the braking torque values.

3. The method of claim 1, wherein providing the at least two braking torque values comprises performing a corresponding number of brake tests in different rotation angle positions of the shaft distributed over 360 degrees.

4. The method of claim 3, wherein the machine control unit automatically provides a brake test result qualifying the brake as functional when at least one of the braking torque values provided by the brake tests is greater than a predetermined minimum braking torque value.

5. The method of claim 3, wherein the machine control unit automatically provides a brake test result qualifying the brake as functional only when all of the braking torque values provided by the brake tests are greater than a predetermined minimum braking torque value.

6. The method of claim 3, wherein the machine control unit automatically provides a brake test result qualifying the brake as nonfunctional when at least one of the braking torque values provided by the brake tests is less than a predetermined minimum braking torque value.

7. The method of claim 6 wherein the machine control unit automatically provides a brake test result qualifying the brake as nonfunctional when all of the braking torque values provided by the brake tests is less than a predetermined minimum braking torque value.

8. The method of claim 1, further comprising:
   determining a first angle range less than 360 degrees which includes at least the rotation angle position of the shaft in which the brake has at least one braking torque value that is less than a predetermined minimum braking torque value; and
   actuating at least one of the brake or the drive motor in such a way that, with the brake engaged, the shaft comes to a stop in a second angle range that is different from the first angle range.

9. The method of claim 8, wherein at least one of the brake or the drive motor is actuated by the machine control unit.

10. The method of claim 1, further comprising:
    determining a first angle range less than 360 degrees which includes at least the rotation angle position of the in which the brake has the smallest braking torque value of all braking torque values provided; and
    actuating at least one of the brake or the drive motor in such a way that, with the brake engaged, the shaft comes to a stop in a second angle range that is different from the first angle range.

11. The method of claim 1, further comprising:
    determining one or more first angle ranges less than 360 degrees which includes at least the rotation angle position of the shaft in which the brake has braking torque values that are less than a predetermined minimum braking torque value;
    determining one or more second angle ranges less than 360 degrees which includes at least the rotation angle position of the shaft in which the brake has braking torque values that are equal to or greater than a predetermined minimum braking torque value; and
    actuating at least one of the brake or the drive motor in such a way that, with the brake engaged, the shaft comes to a stop in the second angle range or in one of the plurality of second angle ranges.

12. The method of claim 1, further comprising
    displaying the result of the comparison of the braking torques on a display; and
    actuating the machine based on the result of the comparison of the braking torque values only when an input means to be actuated is activated.

13. A method for determining a minimum braking torque value of a brake of a machine having a machine control unit and at least one moveable link actuated by the machine control unit in accordance with a machine program and that is adjustable by a drive motor actuated by the machine control unit, which motor drives a shaft and which motor, in an engaged position of a brake that is automatically actuated by the machine control unit, is lockable by the brake, the method comprising:
- actuating the machine by the machine control unit or robot control unit according to the machine program or the robot program,
- determining driving torques of the drive motor in several positions or poses of the at least one link assumed as a result of execution of the machine program; and
- selecting the largest determined driving torque as a predetermined minimum braking torque value.

14. The method of claim 13, further comprising:
- storing the selected driving torque in the machine control unit;
- predetermining a minimum braking torque value; and
- allowing at least one of an automatic release of the brake or an automatic movement of the at least one link only when the predetermined minimum braking torque value is greater than the stored selected driving torque.

15. The method of claim 14, wherein predetermining a minimum braking torque value comprises receiving a manually input value into the machine control unit.

16. A machine comprising a machine control unit and at least one moveable link actuated by the machine control unit and that is adjustable by a drive motor actuated by the machine control unit, which motor drives a shaft and which motor, in an engaged position of a brake that is automatically actuated by the machine control unit, is lockable by the brake;
- the machine control unit including program code stored in a non-transitory, computer-readable storage medium that, when executed by the machine control unit, causes the machine control unit to:
- provide at least two braking torque values wherein the brake is engaged and that are determined in different rotation angle positions of the shaft distributed over 360 degrees;
- analyze the at least two braking torque values by comparing one braking torque value with the at least one other braking torque value; and
- actuate at least one of the machine, the drive motor, or the brake based on a result from the comparison of the braking torque values.

17. The machine of claim 16, wherein:
- the machine is a robot, the machine control unit is a robot control unit, and the robot has a robot arm actuated by the robot control unit; and
- the robot arm has at least a first link, a second link, and a joint that connects the first link to the second link and that is adjustable by the drive motor, which drives the shaft and which, in an engaged position of the brake that is automatically actuated by the robot control unit, is lockable by the brake.

\* \* \* \* \*